(12) United States Patent
Saraswat et al.

(10) Patent No.: US 9,430,319 B2
(45) Date of Patent: Aug. 30, 2016

(54) TRAFFIC CAPACITY BASED OPTIMIZATION OF SOA FAULT RECOVERY USING LINEAR PROGRAMMING MODEL

(71) Applicant: ORACLE INTERNATIONAL CORPORATION, Redwood Shores, CA (US)

(72) Inventors: Rishi Saraswat, Hyderabad (IN); Ganesh Narayanamurthy, Hyderabad (IN); Arvind Kumar Maheshwari, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 13 days.

(21) Appl. No.: 14/531,229

(22) Filed: Nov. 3, 2014

(65) Prior Publication Data
US 2016/0062818 A1 Mar. 3, 2016

Related U.S. Application Data

(60) Provisional application No. 62/041,777, filed on Aug. 26, 2014.

(51) Int. Cl.
*G06F 11/00* (2006.01)
*G06F 11/07* (2006.01)

(52) U.S. Cl.
CPC ......... *G06F 11/0793* (2013.01); *G06F 11/079* (2013.01); *G06F 11/0715* (2013.01); *G06F 11/0751* (2013.01); *G06F 11/0787* (2013.01)

(58) Field of Classification Search
USPC .......................................................... 714/2
See application file for complete search history.

(56) References Cited

U.S. PATENT DOCUMENTS

| | | | |
|---|---|---|---|
| 6,978,394 B1* | 12/2005 | Charny | ............... H04L 45/00 370/228 |
| 8,380,679 B2 | 2/2013 | Majumdar et al. | |
| 2002/0046316 A1* | 4/2002 | Borowsky | ............ G06F 9/5016 711/1 |
| 2005/0125555 A1 | 6/2005 | Patel | |
| 2006/0005063 A1 | 1/2006 | Patrick et al. | |
| 2006/0047742 A1 | 3/2006 | O'Neill et al. | |
| 2012/0102170 A1 | 4/2012 | Hiltunen et al. | |
| 2013/0290794 A1 | 10/2013 | Murphy et al. | |

FOREIGN PATENT DOCUMENTS

KR 2011074206 A 6/2011

OTHER PUBLICATIONS

Weissman et al.,"The Design of the Force.com Multitenant Internet Application Development Platform", http://cloud.pubs.dbs.uni-leipzig.de/sites/cloud.pubs.dbs.uni-leipzig.de/files/p889-weissman-1.pdf, SIGMOD '09, Jul. 2, 2009, 8 pages.

(Continued)

*Primary Examiner* — Sarai Butler
(74) *Attorney, Agent, or Firm* — Kilpatrick Townsend and Stockton LLP

(57) ABSTRACT

Various embodiments are presented for bulk recovery or faults in a service oriented architecture system. The number of faults submitted for recovery is determined based on the capacity of the system. A linear programming model is used to determine the maximum recovery capacity of the system. The maximum recovery capacity is configured to be below the capacity of the system.

20 Claims, 10 Drawing Sheets

(56) References Cited

OTHER PUBLICATIONS

"8.5 Recovering from SOA Composite Application Faults at the SOA Infrastructure Level", http://docs.oracle.com/cd/E17904_01/integration.1111/e10226/soacompapp_mang.htm#BABBCEJC, 17 pages.

Buys, Jonas, "Towards Contex-Aware Adaptive Fault Tolerance in SOA Applications", http://www.pats.ua.ac.be/content/publications/2011/debs020-buys.pdf, DEBS' 11, Jul. 11-15, 2011, 12 pages.

Zhang, Jing, "A Framework for Quality of Service and Fault Management in Service-Oriented Architecture", http://media.proguest.com/media/pg/classic/doc/3036790721/fmt/ai/rep/NPDF?_s=QDFBHZZvu4bPiZdCxstkwFlprQE%3D, ProQuest LLC (2013), 151 pages.

Pallemulle et al., "Byzantine Fault-Tolerant Web Services for n-Tier and Service Oriented Architectures", dsys.cse.wustl.edu/resources/papers/pallemulle-icdcs-08.pdf, 9 pages.

Tan et al., "BPEL4Job: A Fault-Handling Design for Job Flow Management", http://web.ci.uchicago.edu/~wtan/BPEL4Job_ICSOC_07.pdf, 16 pages.

* cited by examiner

| Component Name | Called Entity Name | Called Entity Type | Number of calls |
|---|---|---|---|
| A1 | P1 | SERVICE | 2 |
| A2 | P1 | SERVICE | 1 |
| A3 | A2 | COMPONENT | 2 |
| ... | ... | ... | ... |

FIG. 8A

| Entity Name | Entity Type | Capacity |
|---|---|---|
| S | SOA Infrastructure | 500 |
| A | Composite | 300 |
| A1 | Component | 200 |
| A2 | Component | 300 |
| A3 | Component | 250 |
| P1 | Service | 250 |
| P2 | Service | 300 |

TRAFFIC CAPACITY BASED OPTIMIZATION OF SOA FAULT RECOVERY USING LINEAR PROGRAMMING MODEL

CROSS-REFERENCES TO RELATED APPLICATIONS

The present application claims benefit under 35 USC 119(e) of U.S. Provisional Application No. 62/041,777, filed on Aug. 26, 2014 by Saraswat et al and entitled "Traffic Capacity Based Optimization of SOA Fault Recovery Using Linear Programming Model," of which the entire disclosure is incorporated herein by reference for all purposes

BACKGROUND OF THE INVENTION

Embodiments of the present invention relate generally to methods and systems for bulk fault recovery in a Service Oriented Architecture (SOA) system and more particularly to traffic capacity based optimization of SOA fault recovery using a linear programming model.

Faults in systems such as service oriented architecture (SOA) systems may be tracked and recorded for future recovery. In many cases faults may be recovered in a bulk recovery process. However, bulk recovery may overwhelm the target system exceeding the system's capacity. Bulk recovery may often crash the target system causing more faults that may require recovery at a later time. Hence, there is a need in the art for improvements on bulk recovery that do not exceed the capacity of the system during recovery.

BRIEF SUMMARY OF THE INVENTION

A bulk fault recovery mechanism that determines the number of faults to be submitted for recovery by taking into consideration the maximum recovery capacity of the system is presented. The maximum recovery capacity of the system is determined by formulating a set of linear relationships between capacities of the SOA system entities and finding the constraints on capacities by solving the linear equations using Linear Programming model.

In some embodiments, a method for bulk fault recovery in a service oriented architecture (SOA) system includes receiving a call flow for a composite of the system. The call flow may identify relationships between components of the system. The method may also include receiving historical performance data for the components of the system, and analyzing the historical performance data to determine the capacity of the components of the system. In embodiments the method may also include the step of determining relationship between capacities of components for the composite. Determining relationships may include identifying linear constraints between capacities of the components. The method may also include calculating a recovery capacity of the system by solving the linear constraints between capacities of the components.

In some embodiments the method may also include calculating a number of faults to be submitted on each component for recovery. The calculation may be based, at least in part, on the recovery capacity of system. In embodiments a linear programming model may be used to identifying linear constraints between capacities. Calculating recovery capacity may include solving the linear programming model using the simplex algorithm. In some embodiments the composites may be prioritized. The recovery capacity may be the number of faults that may be processed by the system without exceeding the capacity of the system.

BRIEF DESCRIPTION OF THE DRAWINGS

FIG. 8A illustrates exemplary data for a call flow of a composite and 8B illustrates exemplary capacity data for components of a system according to embodiments of the present invention.

DETAILED DESCRIPTION OF THE INVENTION

Figure 1:
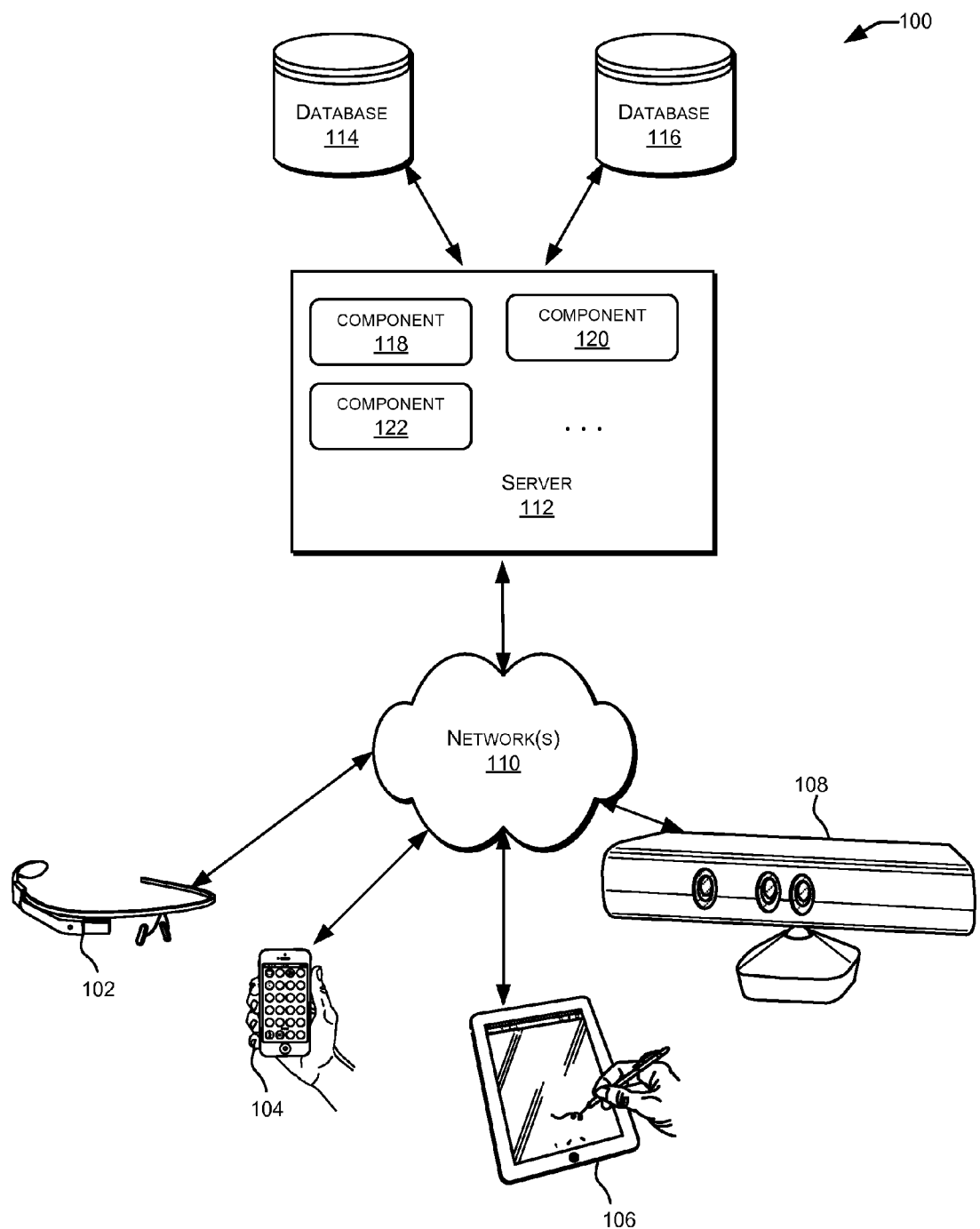
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Transaction errors and other faults between servers or other systems may be recorded and recovered at a later time. In some cases bulk recovery procedures are used to recover the errors. Bulk recovery may involve simulatnous or serialized recovery of multiple errors at a time.

In many cases, efforts to recover the errors may overwhelm the system. Bulk submission of errors for recovery may exceed the capacity of the target system and cause the targer system to crash or stop responding. System failure is especially problematic in service oriented architecture (SOA) systems. SOA systems often rely on continous server availability. Server downtime may result in a cycle that creates more transaction errors and faults, which may cause clients to submit bulk recovery and result in more server downtime.

For example, on some days a server may have limited bandwidth for processing bulk recovery requests. Some events, such as a payroll day or end of quarter or financial year may stress the server to near capacity wherein additional load from a recovery request may cause the server to exceed capacity and crash thereby leading to a large backlog of faults and errors.

A system with fault recovery is presened that performs recovery of faults and errors without causing system overload. In embodiments, the system may selectively recover faults based on the priority of SOA composites and may return the system to a state of normalcy through a selective recovery process. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
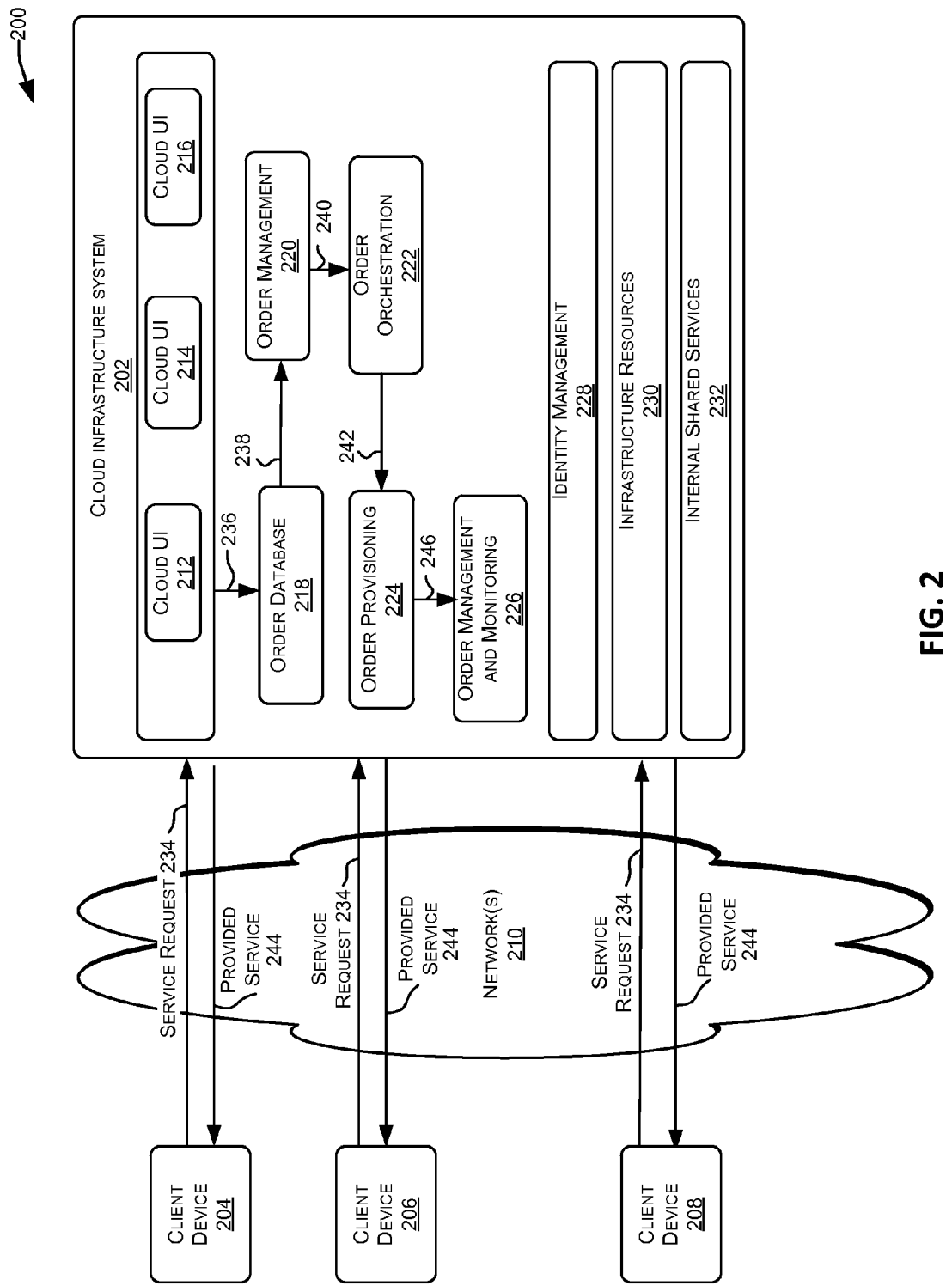
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
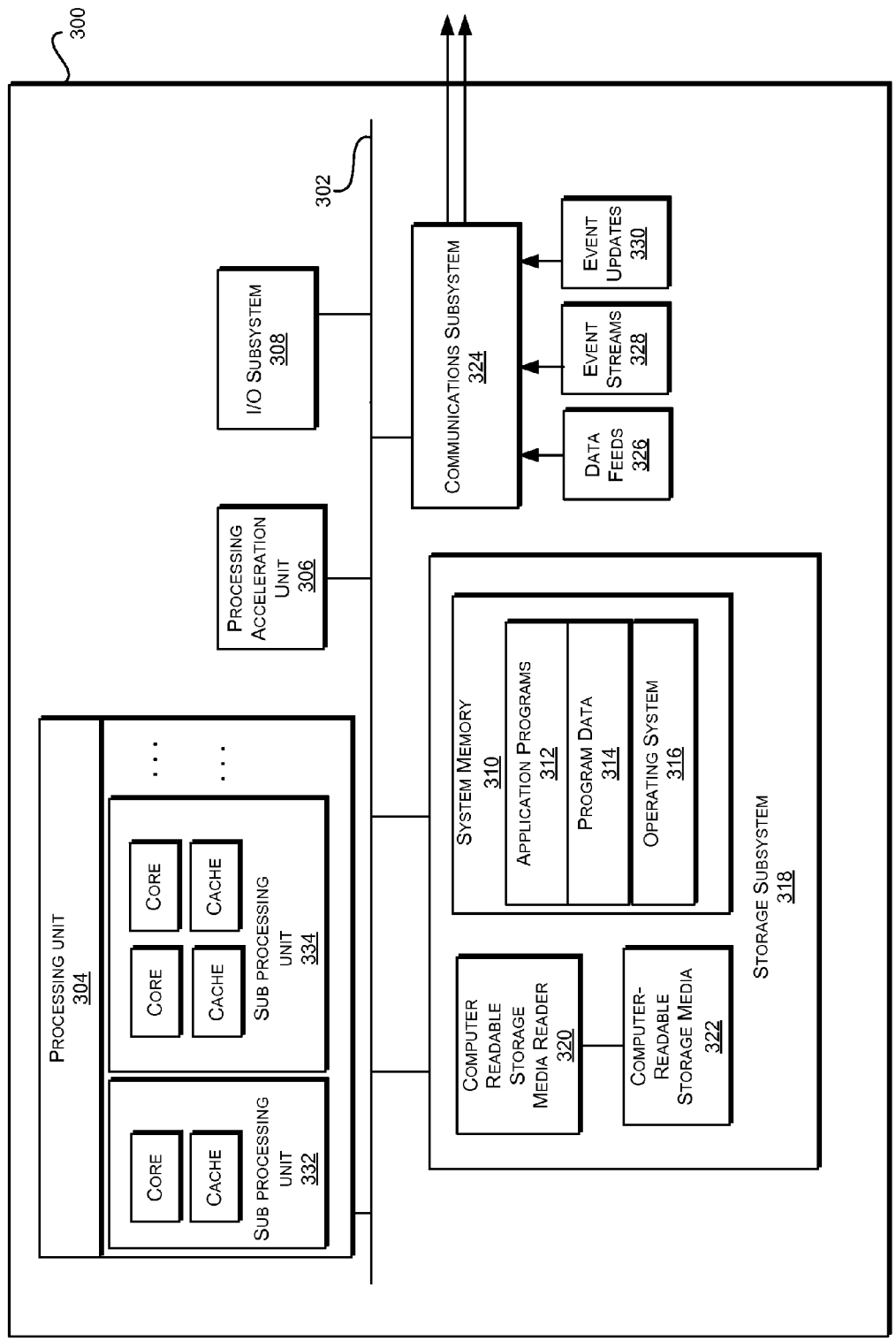
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
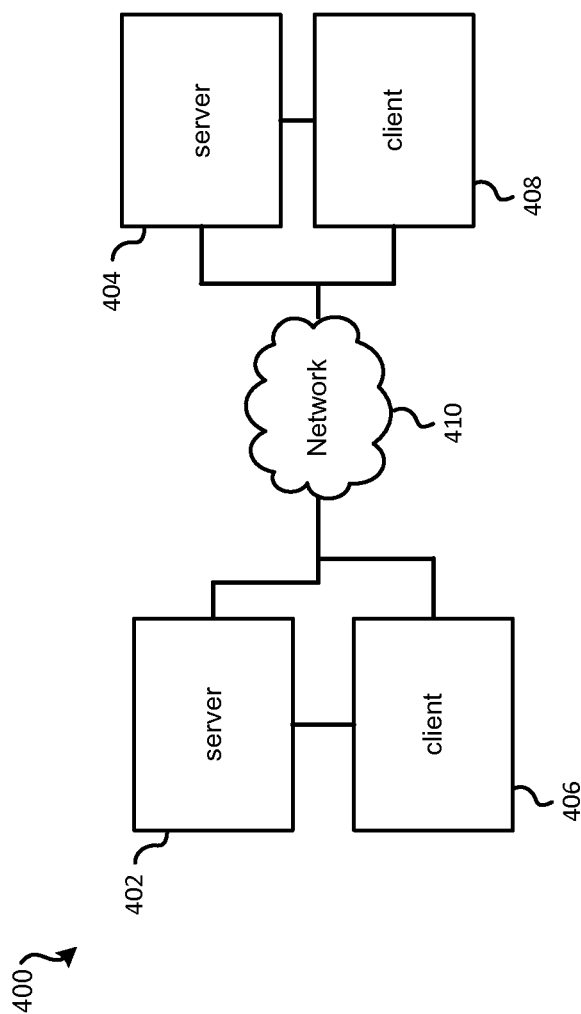
FIG. 4 is a block diagram illustrating an exemplary SOA system in which embodiments of the present invention may be implemented.

FIG. 4 is a block diagram illustrating an exemplary SOA system in which embodiments of the present invention may be implemented. The SOA system 400 may include clients 406, 408 and servers 402, 404. Each server and client may be include one or more computers, server farms, cloud storage systems, and the like. Servers may provide services to clients related to providing information, transaction processing, and the like. Clients and servers may be located on the same network, intranet, or even, the same physical computer system. In some cases clients and serves may be remote from one another an transmit and receive requests between each other using a network 410.

Servers 402, 404 may provide services to clients 406, 408 via one or more transactions. Clients may send transaction requests for information, or other services. In some situations, faults may occur that may prevent transactions from completing. Network 410 faults, hardware failures, congestion, server unavailability, and the like may prevent tresaction requests from clients from reaching servers. Failed transactions may be recorded by the clients. Failed transactions may be reinitiated or recovered at a later time. In some embodiments, failed transactions may be recovered in a bulk recovery process. In a bulk recovery process a client may retransmit or submit reocovery requests for many failed transactions.

For example, a server may provide credit card processing service to a client. A client may transmit a credit card information to a server to receive credit card authorization. In some cases the authorization for the credit card may not be received by the client due to network errors, unavailability of the server, and the like. The client may log the failed transaction and attempt to reauthorize the credit card at a later time. The client may transmit the failed transactions in bulk. In some cases, hundreds of even thousands of failed transactions may be retransmitted to the server. Bulk recovery may overwhelm the server. The bulk recovery may, combined with other requests, cause the server to exceed its processing capacity and may cause the server to crash or stop responding which may cause more failed transactions.

In embodiments, the system may selectively recover faults based on the capacity of the server. The capacity of the server to process transactions may be calculated using a model. Bulk recovery may be configured to submit failed transaction so as to not to exceed server capacity. The timing of the bulk recovery process, the number of failed transactions submitted, and other paramters may be adjusted to reduce the load on the server.

In SOA system, servers may provide complex services that rely on many different components, services, a plularity of physical servers, and the like. The capacity of bulk recovery may be difficult determine or analyze using traditional methods.

In embodiments, bulk recovery may be improved by performing bulk fault recovery in a SOA system based on the capacities of two or more correlated services. Bulk recovery may be improved by performing based on the historical (determined based on the monitoring) capacities of two or more correlated services. Bulk recovery may be improved by adjusting the workload (during recovery) to meet the historical capacities of two or more correlated services.

In embodiments a bulk recovery system may be traffic capacity based. The bulk recovery system may monitor the capacity of the SOA system and the capacity of individual entities like the SOA Infrastructure, SOA composites, SOA components of composites and external services used. In some embodiments the bulk recovery system may maintain a historical record of the SOA system behavior, statistics, and the like. Using historical and current data, the capacity of the SOA system may be determined.

Figure 5:
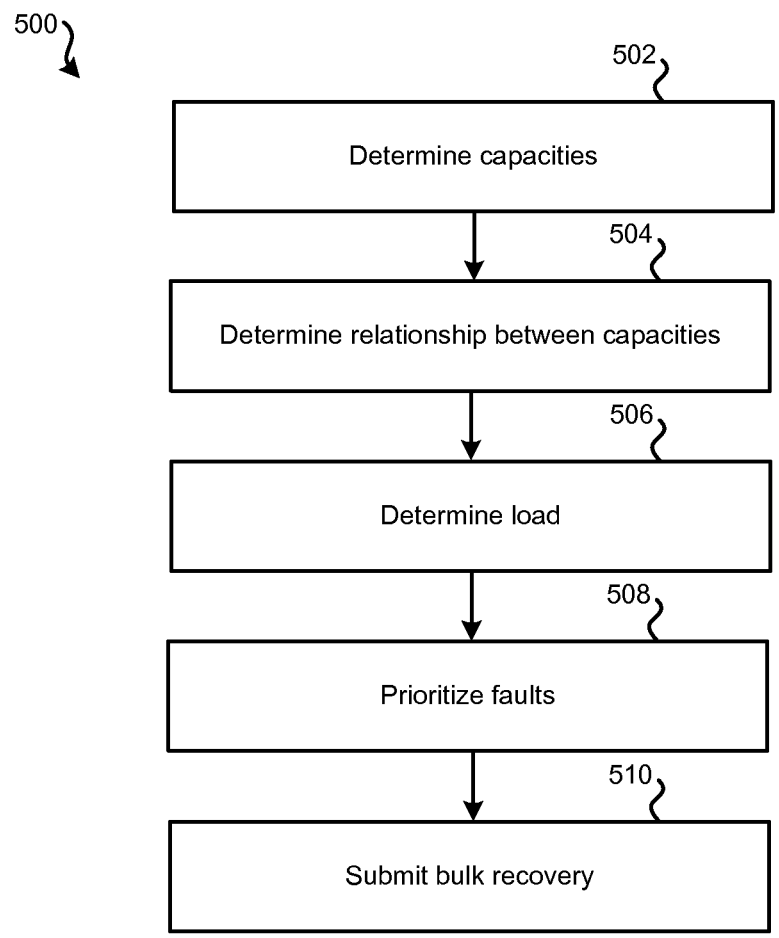
FIG. 5 is a flowchart illustrating a process for bulk recovery according to one embodiment of the present invention.

FIG. 5 is a flowchart illustrating a process for bulk recovery according to one embodiment of the present invention. The method 500 indicates the bulk recovery process by determining capacities of the components and the system and identifying a workload suitable for the system. At block 502 the capacities may be determined. In some cases the capacity of the SOA system may be limited by the SOA infrastructure running on the SOA server. SOA server paramters like server memory, CPU usage may determine capacity. In some cases the capacity of the SOA servers may be determined directly from the infrastructure parameters. In some cases the capacity may be adjusted based on the existing workload of the system. For example, the no-load capacity of the SOA server may be 500 requests/sec, but if it is already handling certain amount of requests, occupying its CPU and memory, then its capacity may be reduced to less than original no-load capacity of 500 requests/sec.

In some cases the capacity of the SOA system may be limited by the SOA composites that are part of SOA Infrastructure. In embodiments, the capacity of the SOA composites may be determined by the capacity of the SOA components that it is built with. Each instance (each request creates one instance) of a SOA composite creates an instance of a SOA component that is run by the component's service engine. The capacity of a SOA composite may therefore be an aggregation over its components capacities. For example, if a SOA composite has 2 BPEL components, and 2 MEDIATOR components, then the capacity of the SOA composite is reduced even if one of its component capacities is reduced.

In embodiments a composite, such as a composite application or service may combine multiple existing functions into a new application or service. A composite may include multiple components that may include calls to various services, may utilize various physical servers, computer system and the like.

In some embodiments the capacity of the SOA components may be limited within the composites. In SOA infrastructure, SOA components may be run by service engines. For example, all SOA components of a type e.g. BPEL, may be run by the BPEL service engine. The capacity of a SOA component may be limited by the capacity of the service engine it is run by. For example, if BPEL service engine's capacity is say 500 requests/sec, and assume 2 composites A and B have 1 BPEL component each. If say composite B is already getting 200 requests/sec (which translates to a call on the BPEL component), then the capacity of the BPEL component of composite A is limited to 300 requests/sec (the left over capacity of the service engine).

In some embodiments the capacity of the SOA components may be limited by the capacity of the external services called from within the SOA composites. For example, banking service may be called from many composites, and may be performing slowly.

After capacities of SOA composites, components, and the like are determined the relationship between the capacities may be determined at block 504. For example, if a SOA composite calls a banking service once, as part of user transaction, then a request on a SOA composite may translate to a request on the banking service. The relationship between the capacities may be determined using various algorithms such as the relationship algorithms of FIG. 9. Relationship determination can utilize the call-flow information of the SOA Components and the external services.

At step 506, a load that doesn't exceed capacity of the system may be determined. Information related to the relationship between capacities may be used to determine how much capacity of SOA Infrastructure, SOA Composite, SOA Components, and external services, is needed to recover a fault unit such as one fault. The load, or number of faults that may be submitted may be limited such that they don't cause the system to exceed capacity of any of the entities involved. The number of faults submitted may be selected so as to maximize the number of faults submitted so that for a given capacity state of the SOA system, maximum possible number of faults are submitted.

At block 508 the SOA composites may be prioritized. Faults may be prioritized according to composites the faults are associated with. A priority list of faults may be generated automatically based on predetermine priority list of composite. In some embodiments an administrator may supply a priority list of composites. The priority list may indicate the priority of recovery. The priority list may be used to progressively pick faults for submission for recovery according to the priority of the associated composites. A set of the highest priority faults may be selected for submission for recovery. At block 510 the selected faults may be submitted for recovery.

Figure 6:
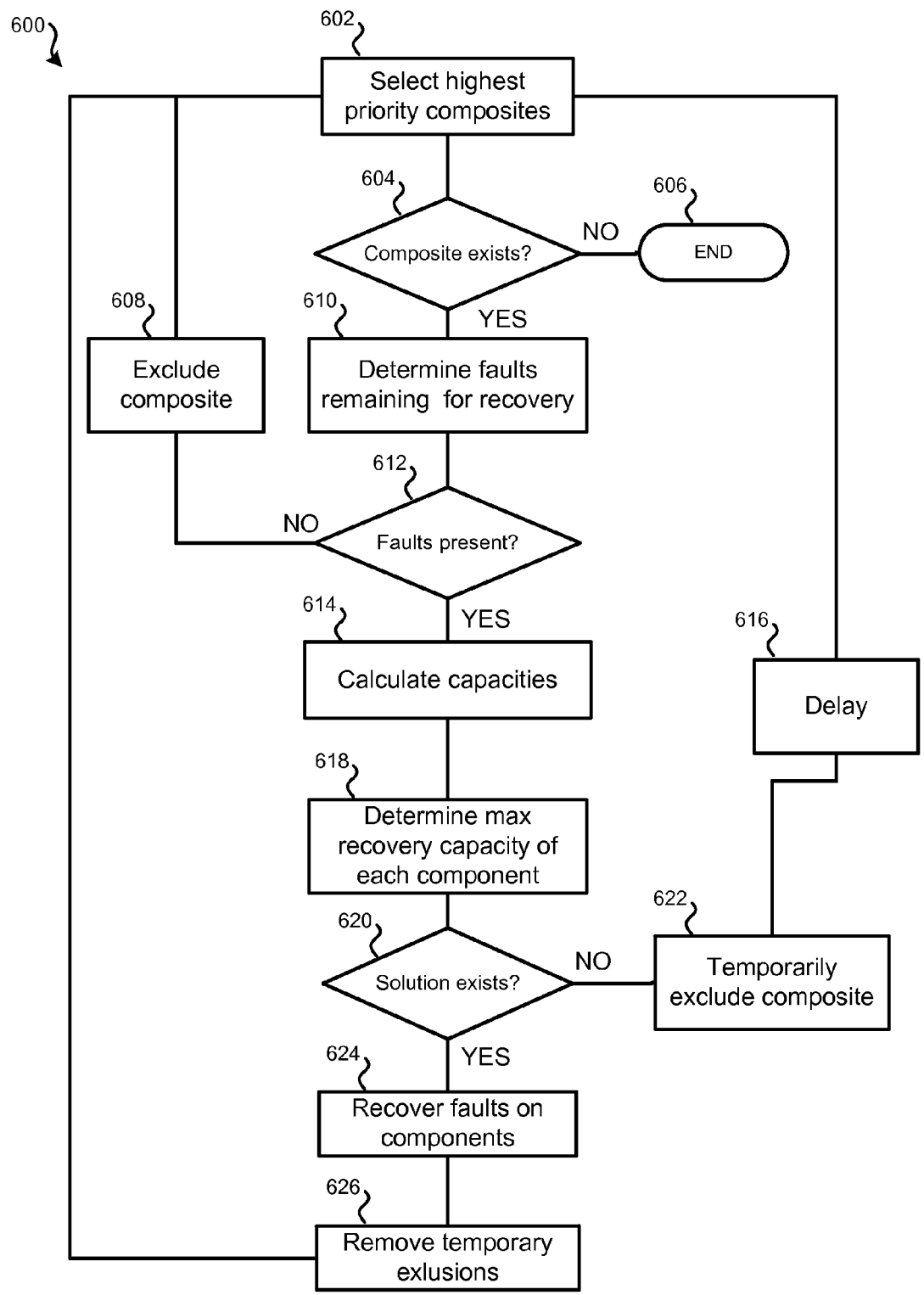
FIG. 6 is a flowchart illustrating a process for prioritized bulk recovery according to one embodiment of the present invention.

FIG. 6 is a flowchart illustrating a process for prioritized bulk recovery according to one embodiment of the present invention. The method 600 shows an iterative process in which each iteration the highest priority composites are selected, and submitted based on the capacities of the entities of the SOA.

At block 602 the highest priority composites may be selected. The composite may be verified at block 604. If the composite no longer exists the method may end at block 606. For the selected composite, the faults remaining for recovery may be determined in block 610. The fault queues for the composite and/or the associated machines may be analyzed to identify outstanding faults that require recovery. The number of outstanding faults for the composite may be analyzed in block 612, if no outstanding faults are present the method may proceed to block 608. At block 608 the composite may be excluded and the method may iterate back to block 602 where the next highest priority composite may be selected.

If faults are determined to exist for the composite at block 612, the capacities for the system may be calculated at step 614. The determination of capacities may include analyzing the historical loads of each component associated with the composite. At block 618 the max recovery capacity of each component associated with the composite may be determined. The max recovery capacity may be the number of faults that can be submitted on each of the components of the composite that will not exceed the capacity of the component. In some cases, the max recovery capacity may not exist or may not be determined. When finding the recovery capacity of the components of the composite, the external services may be completely un-available, and hence recovery cannot be submitted on them. For example, in some cases, the components associated with the composite may be unavailable or may be operating at near capacity. If at block 620 it is determined that a max recovery capacity cannot be determined the method may proceed to block 622. At block 622 the composite may be temporarily excluded. At block 616 a delay may be added that prevents from composite from being iterated in the method. The delay may be timer that prevents the iteration of the composite for 5 seconds or more. The delay may be long enough to allow components of the system to process their queues. The delay may be set to a duration that allows the state of the system to change.

If at block 620 it is determined that a max recovery capacity can be determined the method may proceed to block 624. At block 624 the faults of the composite may be submitted for recovery. The number of faults submitted may be less than or equal to the max recovery capacity determined at block 618. If there are more faults for the component than the recovery capacity, the faults may be submitted in batches wherein each batch is only submitted after a previous batch of faults has been recovered. At block 626, after all the faults have been submitted for the component, temporary exclusions on other components may be removed and the method may iterate back to block 602.

The method of 600 may repeat until all faults of all SOA composites have been recovered. For each iteration of method 600, the capacities of the entities associated with each composite may be re-calculated ensuring that the number of faults submitted for recovery is within the capacity of the system. The method will terminates when all faults of all composites have been recovered.

In embodiments, the capacity of entities of the SOA system may be determined from historical data of metrics that that are collected over days or even months of system operation. Capacities of entities like SOA-Infrastructure, SOA composite, SOA component and external services can be determined for each. In embodiments regression models may be used to arrive at the estimated capacity value for each entity.

Figure 7:
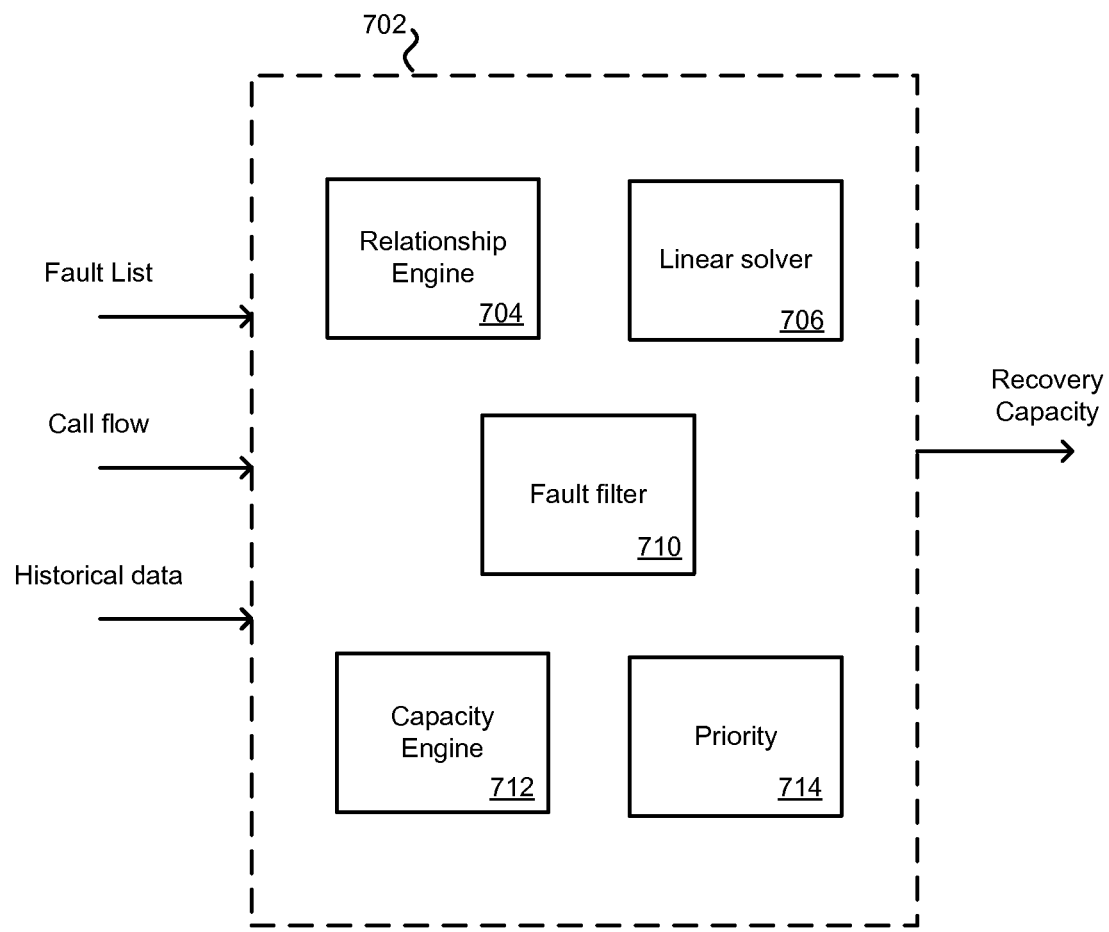
FIG. 7 is a block diagram illustrating elements of a SOA fault recovery system according to one embodiment of the present invention.

FIG. 7 is a block diagram illustrating elements of a SOA fault recovery system according to one embodiment of the present invention. The system 702 may be used to determine the recovery capacity of the system and determine which and how many faults to submit for recovery on each SOA composite's components, and finally submit those faults for recovery. The system 702 may include various modules such as a relationship engine 704, a linear solver module 706, a fault filter 710, a capacity engine 712, and a priority module 714. The system may take as input a fault list for various components of a SOA system, historical performance data, and call flow for the composites of the system. The output of the system may be a recovery capacity of the elements the SOA system. In embodiments the functionalities of the various modules may be combined or divided into a different number of modules and some embodiments of the system include a subset of the functionalities described herein.

In embodiments the capacity engine 712 may be used to process historical data to determine the capacities of the elements of the SOA system. The capacity engine may use regression techniques to analyze historical data to identify the capacity of the elements.

The fault filter module 710 may be used to filter fault lists. In some cases fault lists may include faults that cannot be resolved or faults that are not critical and may be ignored. The fault filter module 710 may categorize faults into classes which may include resolvable faults, high priority faults, and faults which may be ignored.

The priority module 714 may be configured to determine priority of the composites of the systems. In some cases the priority module 714 may determine priority automatically based on the activity of the composites. Active composites that receive many calls may be considered high priority. In some cases the priority module 714 may receive and process input from an administrator specifying the priority of the composites.

The relationship engine 704 may be configured to determine the capacity relationships between entities of the SOA system. The relationship engine may use the capacities of the entities of the system as determined by the capacity engine 712 and the call flow data of SOA composites to identify capacity relationships between entities of the SOA system. The capacity relationships may determine linear relationships that may identify a linear programming model of the system. The set of linear relationships may be analyzed and solved by the linear solver module 706 to determine the maximum recovery capacity of the system or the maximum number of faults that may be submitted in bulk on each SOA component of given SOA composites without exceeding the capacity of the system. In embodiments the relationship engine 704 may execute the method of FIG. 9 described below.

Figure 9:
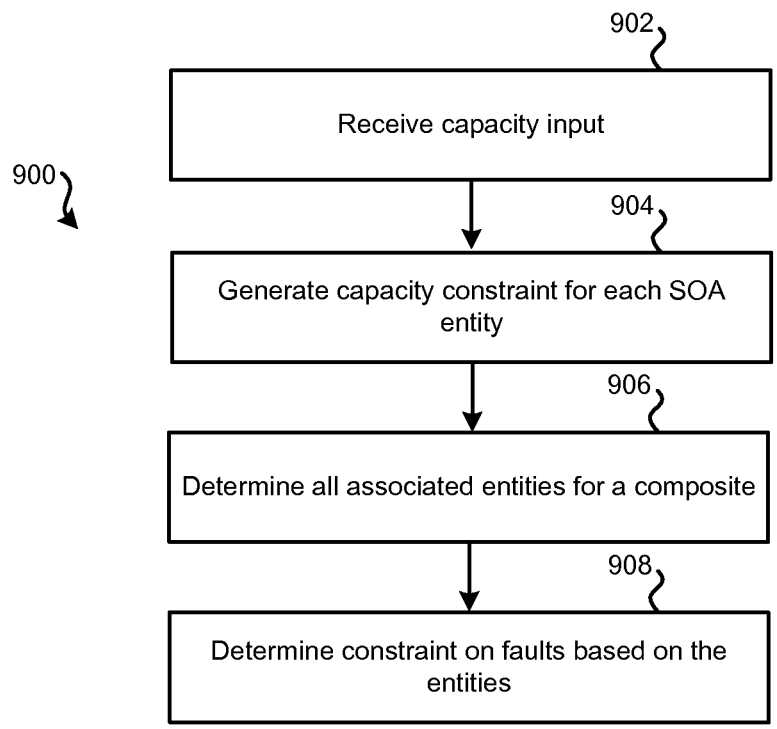
FIG. 9 is a flowchart illustrating a process for determing the relationship between capacities of a system according to one embodiment of the present invention.

FIG. 8A illustrates exemplary data for a call flow of a composite and 8B illustrates exemplary capacity data for components of a system according to embodiments of the present invention. FIG. 9 is a flowchart illustrating a process for determing the relationship between capacities of a system according to one embodiment of the present invention. At block 902 the capacity of entities of the system may be received. The capacity data may be include data such as depicted in FIG. 8B. The data may include the name of the component, the type of entity, and the capacity of each entity. The data may also include data that identifies which entities are used or called by each composite. For example, FIG. 8A shows a table of data with the entities called by one composite. The table provides information about the types of entities that the composite calls and how many times.

At block 904 the capacity data (i.e. data such as depicted in FIG. 8B) may be used to generate capacity constraints for each composite. The data may be analyzed to determine the entity associated with the composite that has the lowest capacity. The entity that has the lowest capacity may create a bottle neck for the composite and may limit the capacity even if other entities may have a higher capacity.

At block 906, using flow table (i.e. data such as depicted in FIG. 8A), for every service and component called by the composite, the generate a sum constraint of the components faults to be less than the service's capacity.

At block 908 determine constraint on faults. For example, component A2 is called by A3 twice. Now A2 calls a service P1 once. P1's capacity is 250, and A2 capacity is 300. So we generate 2 constraints for A3.

Using the constraints determined using the relationship algorithm of FIG. 9, the maximum faults to be submitted for recovery on each SOA component of SOA composites may be calculated. The set of constraints on each component may be expressed as a set of linear equations. The set of linear equations may be, using a linear programming approach, used to determine the maximum number of faults that may be submitted without exceeding the capacity of the system. In embodiments, a linear programming algorithms such as a "Simplex algorithm" may be used for solving the set of linear constraints.

Figure 10:
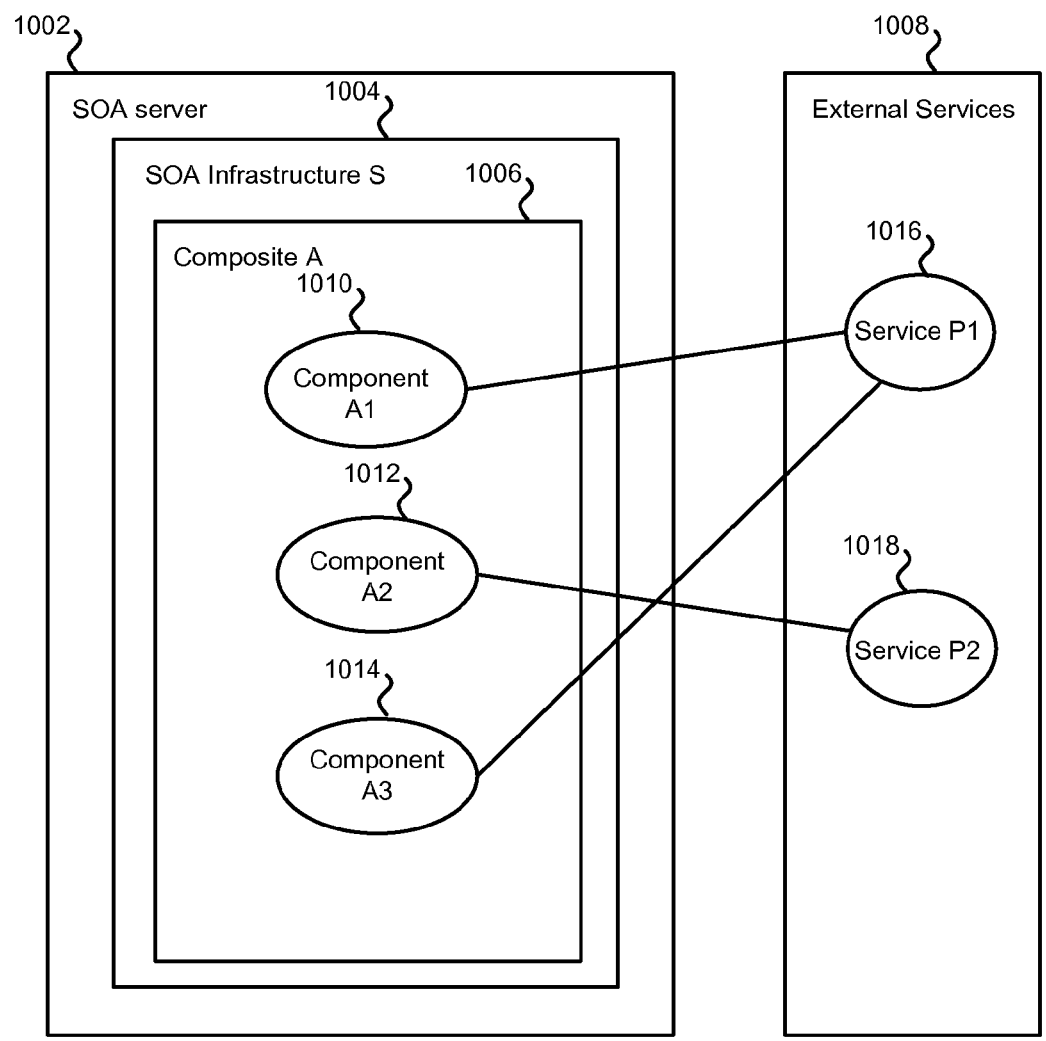
FIG. 10 a block diagram illustrating a call flow in an exemplary SOA system according to one embodiment of the present invention.

FIG. 10 a block diagram illustrating a call flow in an exemplary SOA system according to one embodiment of the present invention. The SOA system may include an SOA server 1002 and external services 1008. The SOA server 1002 may include SOA infrastructure 1004 which may include composites. The example is FIG. 10 shows one composite 1006 (Composite (A)), but it is to be understood that systems may have any number of composites. The composite 1006 may include a number of components 1010, 1012, 1014 or entities which may use the external services 1016, 1018.

A call to composite A, may translate to one call each on components A1 1010, A2 1012, and A3 1014. Component A1 1010 calls the service P1 1016 once, while component A3 1014 calls P1 1016 twice. Similarly, Component A2 1012 calls Service P2 1018 once.

Let the calculated capacities of the entities shown be as follows: (the numbers indicate the capacity of the entity, in terms of no. of requests it can handle per second): S=500; A=300; A1=200; A2=300; A3=250; P1=250; and P2=300. Let the number of faults on each component in composite A be: M1=500; M2=300; and M3=600.

To find n1, n2, n3 which are the number of faults to be submitted for recovery on components A1, A2, A3 respectively the capacity of the capacity of the entities of the system may be first determined. Historical usage and performance data may be used to calculate the capacities for the SOA infrastructure 1004, the composite A 1006, the components of the composites 1010, 1012, 1014, and the external services 1016, 1018.

From call flow (i.e. components of composite A call services), the relationship between the capacities may be calculated to determine a set of constraints. In embodiments, the relationship algorithm from FIG. 9 may be used to calculate the constraints. For example, let n1, n2, and n3 be the recovery capacity of each of the components A1, A2 and A3. The recovery capacities n1, n2, and n3 may be equal to the number of faults that can be submitted on each of the components without exceeding any capacity of each component.

In embodiments the relationship algorithm may be used to maximize: n1+n2+n3 within the following constraints:

n1+n2+n3<=500 (Faults submitted shouldn't exceed soa-infra capacity);

n1<=200 (Faults submitted on A1 shouldn't exceed its capacity);

n2<=300 (Faults submitted on A2 shouldn't exceed its capacity); and n3<=250 (Faults submitted on A3 shouldn't exceed its capacity).

Since A1 and A2 call P1 only once, constrain A1 and A2 should also not exceed P1 capacity:

n1<=250; and n3<=250.

Since A3 calls P2 twice: constrain n2 should not exceed P1 capacity: n2<=300. The determination of constraints may be determined automatically as part of the bulk recovery.

The set of constraints above constitute a linear programming model for which a linear programming algorithm (Such as the Simplex Algorithm) may be used to determine and maximize n1+n2+n3. In this example, the simplex algorithm may be used to solve the above set of equations such that max faults=500, n1=100, n2=150, n3=250.

The faults may be submitted for recovery based on the calculated constraints. The system may submit for recovery 100 faults on component A1, 150 faults on component A2, 250 faults on component A3.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for bulk fault recovery in a service oriented architecture (SOA) system, the method comprising:

receiving a call flow for a composite of the system, the call flow identifying relationships between components of the system;

receiving historical performance data for the components of the system;

analyzing the historical performance data to determine the capacity of the components of the system;

determining relationships between capacities of components for the composite, wherein determining relationships comprises identifying linear constraints between capacities of the components; and calculating a recovery capacity of the system by solving the linear constraints between capacities of the components.

2. The method of claim 1, further comprising calculating a number of faults to be submitted on each component for recovery, wherein the calculation is based, at least in part, on the recovery capacity of system.

3. The method of claim 1, wherein identifying linear constraints between capacities comprises determining a linear programming model.

4. The method of claim 3, wherein calculating the recovery capacity comprises solving the linear programming model using the simplex algorithm.

5. The method of claim 1, further comprising prioritizing composites.

6. The method of claim 1, wherein the recovery capacity comprises number of faults that may be processed by the system without exceeding the capacity of the system.

7. The method of claim 4, wherein calculating the recovery capacity comprises calculating the maximum recovery capacity.

8. A computer-readable memory comprising a set of instructions stored thereon which, when executed by a processor, causes the processor to perform bulk fault recovery in a service oriented architecture (SOA) system by:
   receiving a call flow for a composite of the system, the call flow identifying relationships between components of the system;
   receiving historical performance data for the components of the system;
   analyzing the historical performance data to determine the capacity of the components of the system;
   determining relationships between capacities of components for the composite, wherein determining relationships comprises identifying linear constraints between capacities of the components; and
   calculating a recovery capacity of the system by solving the linear constraints between capacities of the components.

9. The computer-readable memory of claim 8, further comprising calculating a number of faults to be submitted on each component for recovery, wherein the calculation is based, at least in part, on the recovery capacity of system.

10. The computer-readable memory of claim 8, wherein identifying linear constraints between capacities comprises determining a linear programming model.

11. The computer-readable memory of claim 10, wherein calculating the recovery capacity comprises solving the linear programming model using the simplex algorithm.

12. The computer-readable memory of claim 8, further comprising prioritizing composites.

13. The computer-readable memory of claim 8, wherein the recovery capacity comprises number of faults that may be processed by the system without exceeding the capacity of the system.

14. The computer-readable memory of claim 8, wherein calculating the recovery capacity comprises calculating the maximum recovery capacity.

15. A system for bulk fault recovery in a service oriented architecture (SOA) system comprising:
   a relationship engine configured to receive a call flow for a composite of the system, the call flow identifying relationships between components of the system;
   a capacity engine configured to:
      receive historical performance data for the components of the system;
      analyze the historical performance data to determine the capacity of the components of the system;
   the relationship engine further configured to determine relationship between capacities of components for the composite, wherein determining relationships comprises identifying linear constraints between capacities of the components; and
   a linear solver configured to calculate a recovery capacity of the system by solving the linear constraints between capacities of the components.

16. The system of claim 15, wherein the system is further configured to calculate a number of faults to be submitted on each component for recovery, wherein the calculation is based, at least in part, on the recovery capacity of system.

17. The system of claim 15, wherein identifying linear constraints between capacities comprises determining a linear programming model.

18. The system of claim 17, wherein calculating the recovery capacity comprises solving the linear programming model using the simplex algorithm.

19. The system of claim 15, further comprising a priority module configured to prioritize composites.

20. The system of claim 15, wherein the recovery capacity comprises number of faults that may be processed by the system without exceeding the capacity of the system.

* * * * *